Jan. 19, 1960   J. C. AGARWAL   2,921,848
FLUIDIZED-BED REDUCTION OF ORE
Filed Nov. 21, 1957
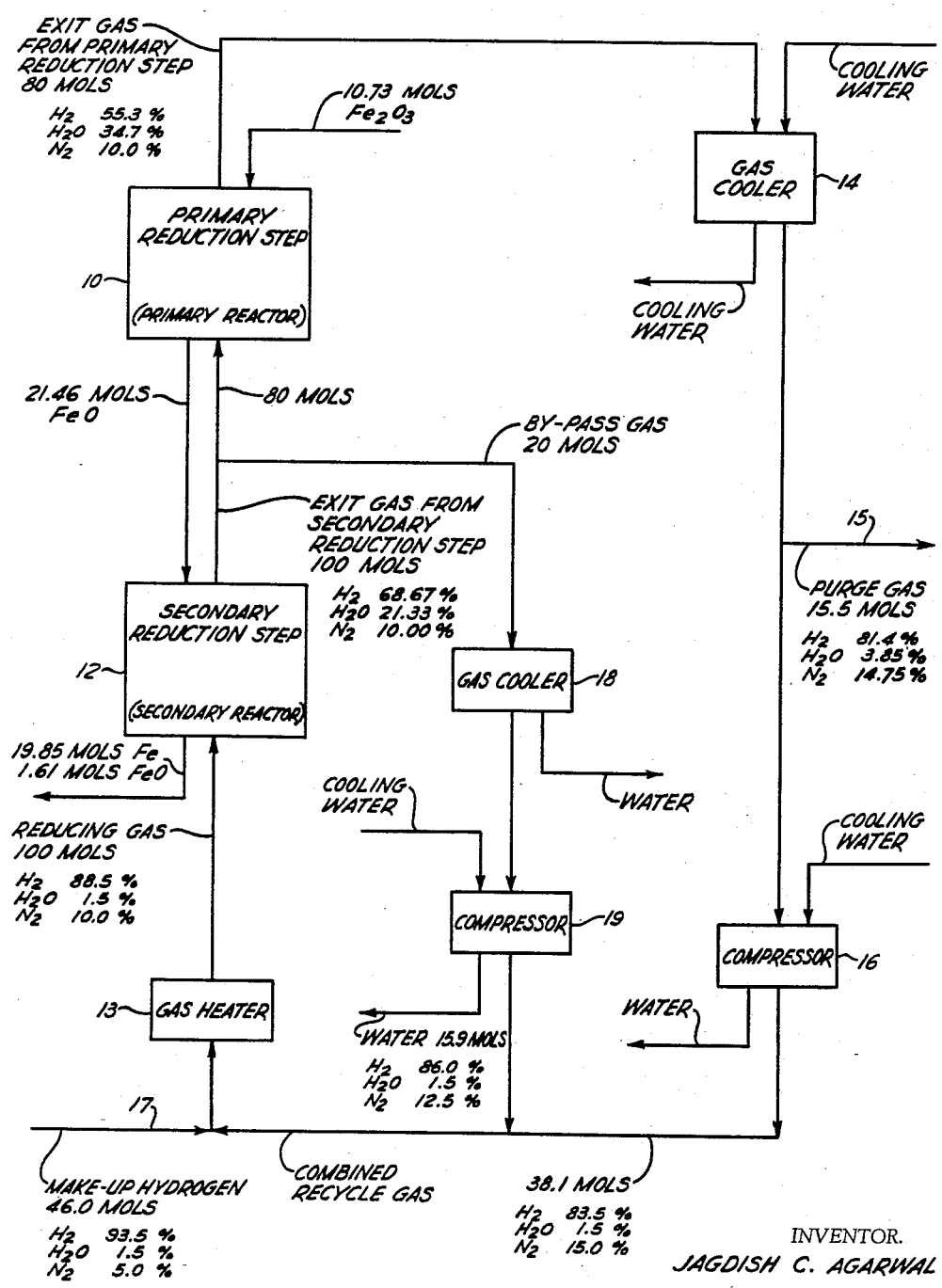
INVENTOR.
JAGDISH C. AGARWAL
BY Donald G. Dalton
ATTORNEY 2,921,848
Patented Jan. 19, 1960

2,921,848

FLUIDIZED-BED REDUCTION OF ORE

Jagdish C. Agarwal, Verona, Pa., assignor to United States Steel Corporation, a corporation of New Jersey Application November 21, 1957, Serial No. 697,910

2 Claims. (Cl. 75—26)

This invention relates to an improved apparatus and method for continuous direct reduction of iron oxide in a two-step fluidized bed system.

In a typical continuous direct reduction system, preheated iron oxide fines are treated in a series of fluidized beds with ascending currents of reducing gas, such as hydrogen, carbon monoxide or mixtures thereof. Efficiency in gas utilization can be promoted by performing the reduction in two steps, that is, in a primary step where higher oxides $Fe_2O_3$ and/or $Fe_3O_4$) are reduced substantially to FeO, and in a secondary step where the resulting FeO is reduced to metallic iron. Off-gas from the secondary step retains sufficient reducing capacity for use in the primary step, even though its composition has approached equilibrium for use in the secondary step. Thus use of this gas in the primary step conserves reducing capacity which would be lost if all reduction were performed in a single step. Off-gas from the primary step is regenerated and recycled. Regeneration involves removal of oxidation products $H_2O$ and/or $CO_2$, with consequent increase in the concentration of inerts, such as nitrogen. The usual practice is to purge a portion of the regenerated gas to limit build-up of inerts. Fresh reducing gas is added to the system to replace that consumed and purged. One example of a system of this sort is shown in Shipley Patent No. 2,752,234.

Reducing gas must be forced through fluidized beds under a positive pressure. As gas passes through each fluidized bed, resistance to flow causes a pressure drop, which in turn causes a velocity increase. Thus the exit gas velocity from the primary step tends to exceed that from the secondary step. This velocity increase has disadvantages that the time of contact between solids and gas becomes less, which is detrimental to efficient gas utilization, and that dust loading becomes excessive.

An object of the present invention is to provide an improved apparatus and method for continuous direct reduction of iron oxide in steps in which the exit velocity from the primary step is lowered to match that from the secondary, thus increasing efficiency and reducing dust loading.

A further object is to provide an improved continuous two-step direct reduction apparatus and method which decrease the mols of reducing constituents needed to be purged to maintain a given maximum inert concentration, thereby further promoting efficient gas utilization.

A more specific object is to provide an improved continuous two-step direct reduction apparatus and method in which a calculated portion of off-gas from the secondary step bypasses the primary step, leaving only enough gas passing through the primary step approximately to equalize the exit gas velocities from the two steps.

In the drawing the single figure is a schematic flowsheet of an apparatus and method embodying my invention including exemplary compositions and numerical values per 100 mols of reducing gas to facilitate explanation.

The figure shows schematically primary and secondary reactors 10 and 12, which can be of any conventional construction wherein ascending gas currents maintain beds of finely divided solids in a fluidized state. The reactors are of course equipped with conventional dust collectors, not shown. Iron oxide fines preheated to approximately 1600 to 1800° F. feed continuously into the primary reactor and thence flow into the secondary reactor, from which they discharge reduced predominantly to metallic iron. Commonly the reduced product is agglomerated and cooled for any appropriate use. Reducing gas consisting essentially of hydrogen, carbon monoxide or mixtures thereof is preheated to approximately 1500 to 1700° F. in a heater indicated schematically at 13 and introduced continuously to the secondary reactor, where it maintains the solids as a fluidized bed and reacts therewith in a manner hereinafter explained. To simplify illustration of the invention, the drawing shows an example in which the active constituent of the gas is hydrogen alone, but this example is not intended as limiting. Off-gas from the secondary reactor is introduced continuously to the primary reactor where its functions are similar, although the reactions differ.

Off-gas from the primary reactor flows to conventional regenerating means, which is indicated schematically at 14 and can include a cooler for condensing out water and/or an absorber for carbon dioxide, depending of course on the active constituents of the reducing gas. Again to simplify the illustration, the drawing shows the regenerating means as a cooler alone, but this showing likewise is not intended as limiting. After the gas leaves the regenerating means 14, a portion is purged to limit build-up of inerts, as indicated at 15. Next the remaining regenerated gas goes to a conventional compressor indicated schematically at 16. Alternatively the gas can be purged after it has been compressed. The compressor restores the pressure of the gas to about 20 to 100 p.s.i.g. for use in the reactors and also condenses out further moisture. Fresh reducing gas under similar pressure is added to the compressed and regenerated gas as indicated at 17 to make up for that consumed and purged. The combined fresh and recycled gas next enters the gas heater 13.

In practicing the invention, I maintain process conditions in the two reactors which substantially confine the reducing reactions in the primary to one or more of the following:

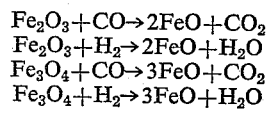

In the secondary the reactions are one or both of the following:

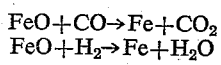

As these reactions proceed, the reducing constituents CO and/or $H_2$ of the gas are consumed, while the oxidation products $CO_2$ and/or $H_2O$ build up. In each instance the ratios $CO_2/CO$ and/or $H_2O/H_2$ can reach values sufficiently high that the reaction in effect ceases and the reacting substances approach equilibrium. In the secondary reduction step equilibrium is reached at lower ratios than in the primary, thus enabling off-gas from the secondary to be used as reducing gas in the primary, as already described.

The practical temperature range for both steps is 1100 to 1400° F., the preferred temperature being about 1300° F. In theory the lower temperature limit in the primary step is governed by the lowest temperature at which hematite and magnetite reduce to wustite (FeO) rather than directly to metallic iron. The lower limit in the secondary is governed by the lowest temperature which leaves sufficient reducing capacity in the off-gas to reduce the requisite quantity of higher oxide to FeO in the primary step, as determined by the applicable equilibrium constant. The upper temperature limit is governed by the maximum that does not cause reduced particles to stick together and stop fluidization.

Equilibrium conditions can be approached closely in the secondary step so that substantially the full capacity of the gas to reduce FeO to metallic iron is utilized. However, if all the off-gas from the secondary step goes to the primary step, conditions in the primary never closely approach equilibrium, but the final off-gas still has unused capacity for reducing higher oxides to FeO. Thus more gas than necessary passes through the primary reactor. As already mentioned, the pressure drop which occurs as gas flows through the resistance of the beds undesirably increases the exit gas velocity from the primary reactor. Furthermore the greater the gas volume, the greater its velocity, assuming uniform cross-sectional area.

In accordance with the present invention, I bypass about 4 to 30 percent of the off-gas from the secondary reduction step without allowing it to pass through the primary. The smaller volume of gas through the primary reactor lowers the gas velocity therein, thus increasing the time of contact between solids and gas, as well as lessening the dust loading. The portion to be bypassed is calculated to produce approximately equal exit gas velocities in the range 0.8 to 2 feet per second from the two reactors, but of course leaving sufficient gas flow through the primary reactor to accomplish the desired reduction. The portion X of gas to be bypassed to attain equal exit velocities can be determined from the equation:

$$\frac{(V-X)}{p_1}T_1 = \frac{V}{p_2}T_2$$

where V is the volume of gas in the secondary reactor at standard conditions; $p_1$ is the absolute pressure at the exit of the primary reactor; $T_1$ is the absolute temperature in the primary reactor; $p_2$ is the absolute pressure at the exit of the secondary reactor; and $T_2$ is the absolute temperature in the secondary reactor.

The bypassed gas is regenerated and compressed and rejoins regenerated and compressed gas from the primary reduction step. In the illustration bypassed gas goes through a separate regenerating means and compressor indicated schematically at 18 and 19 respectively. I prefer this arrangement since I do not wish to purge any bypassed gas which remains relatively rich in reducing constituents, and further since this gas already is under greater pressure than off-gas from the primary reactor. Nevertheless it is apparent some benefits of my invention can be attained if the bypassed gas rejoins the other gas either ahead of the first regenerating means 14 or ahead of the first compressor 16. While these alternative arrangements either would lead to purging of some bypassed gas or would increase the power requirements for the compressor, they would simplify the apparatus either by eliminating both the second regenerating means and the second compressor or by eliminating only the second compressor. Again to simplify the illustration, the regenerating means 18 is shown as a cooler only, but this showing is not intended as limiting.

The drawing indicates a possible set of numerical values and compositions based on 100 mols of reducing gas. In this example the temperatures in both reactors are about 1300° F., and the absolute pressure at the exit of the secondary reactor and the inlet of the primary reactor is 25 p.s.i. The pressure drop in the primary reactor is 5 p.s.i., whereby the exit gas velocity from the primary reactor would increase 25 percent if no gas were bypassed. Solution of the foregoing equation determines that 20 percent of the off-gas from the secondary reactor should be bypassed to produce equal exit velocities.

By reference to the drawing, it is seen that 15.5 mols of regenerated gas having a content of 81.4% $H_2$ are purged to limit the nitrogen content to 10% in gas introduced to the secondary reactor. Similar calculations establish that a system in which no gas is bypassed but otherwise identical requires purging of 16.75 mols of regenerated gas having a content of 82.0% $H_2$ to maintain the same nitrogen content. Thus my invention conserves hydrogen to the extent of more than one mol per pass, a saving of approximately six to seven percent in the quantity of purge gas. Despite the high content of reducing constituents in the purge gas, this gas is useful only for fuel or the like. Hence any saving of reducing constituents from purging is significant.

From the foregoing description it is seen that my invention affords a simple apparatus and method for equalizing exit gas velocities from the reactors in a two-step continuous direct reduction system. Thus dust loading is reduced and greater efficiency is attained in utilization of reducing gas.

While I have shown and described certain preferred embodiments of my invention, it is apparent that other modifications may arise. Therefore, I do not wish to be limited to the disclosure set forth but only by the scope of the appended claims.

I claim:

1. In a continuous process for directly reducing iron oxide fines in a primary step substantially to FeO and in a secondary step predominantly to metallic iron, wherein ascending currents of preheated reducing gas fluidize and reduce already partially reduced fines in said secondary step, ascending currents of off-gas from said secondary step fluidize and partially reduce preheated fines in said primary step, and off-gas from said primary step is regenerated and recycled in the process, and wherein resistance to gas flow through the fines causes a pressure drop which tends to cause an increase in the exit gas velocity from each step, a method of equalizing the exit velocities of gas from the two steps comprising bypassing 4 to 30 percent of the off-gas from said secondary step around said primary step, and regenerating and recycling the bypassed gas.

2. In a continuous process for directly reducing iron oxide fines in a primary step substantially to FeO and in a secondary step predominantly to metallic iron, wherein ascending currents of preheated reducing gas fluidize and reduce already partially reduced fines in said secondary step, ascending currents of off-gas from said secondary step fluidize and partially reduce preheated fines in said primary step, off-gas from said primary step is regenerated by removal of oxidation products, a portion of the regenerated gas is purged to limit build-up of inerts, the remainder of the regenerated gas is compressed and recycled, and fresh reducing gas is added to make up for that consumed and purged, and wherein resistance to gas flow through the fines causes a pressure drop which tends to cause an increase in the exit gas velocity from each step, a method of equalizing the exit velocities of gas from the two steps and at the same time cutting down on the loss of reducing gas by purging comprising bypassing 4 to 30 percent of the off-gas from said secondary step around said primary step, and regenerating and recycling the bypassed gas without any purging thereof.

References Cited in the file of this patent

UNITED STATES PATENTS

| | | |
|---|---|---|
| 2,481,217 | Hemminger | Sept. 6, 1949 |
| 2,509,921 | Gwynn | May 30, 1950 |
| 2,752,234 | Shipley | June 26, 1956 |